US005117218A

United States Patent [19]

Sasaki et al.

[11] Patent Number: 5,117,218

[45] Date of Patent: May 26, 1992

[54] WARNING SYSTEM FOR AN ENGINE

[75] Inventors: Asao Sasaki, Chiba; Yosuke Kubota, Tokyo, both of Japan

[73] Assignee: Fuji Jukogyo Kabushiki Kaisha, Tokyo, Japan

[21] Appl. No.: 541,764

[22] Filed: Jun. 21, 1990

[30] Foreign Application Priority Data

Jun. 26, 1989 [JP] Japan .................................. 1-164829
Jun. 26, 1989 [JP] Japan .................................. 1-164830

[51] Int. Cl.$^5$ .............................................. B60Q 1/00

[52] U.S. Cl. ................................ 340/450.3; 340/450; 340/612; 361/1; 307/10.1; 307/10.6; 180/271; 180/277; 180/279; 180/283

[58] Field of Search ..................... 340/450.3, 439, 450, 340/460, 449, 451, 612, 618; 123/198 D; 180/271, 277, 279, 283; 11/11; 307/9.1, 10.1, 10.6; 361/1, 247; 73/290 R, 293

[56] References Cited

U.S. PATENT DOCUMENTS 3,886,518 5/1985 Bozoian .............................. 340/450
4,933,852 6/1990 Lemelson ............................ 340/439

FOREIGN PATENT DOCUMENTS 62-26379 2/1987 Japan .
62-121833 6/1987 Japan .

*Primary Examiner*—Donnie L. Crosland
*Attorney, Agent, or Firm*—Beveridge, DeGrandi & Weilacher

[57] ABSTRACT

A warning system for warning a lack of a working fluid for an engine. The engine is provided with an ignition unit supplied with an ignition power supply from a magneto. A sensing unit senses the lack of the working fluid and produces a detection signal. A warning element, connected to the magneto, receives a power supply to give a warning indicating the lack of the working fluid. A controller is responsive to the detection signal from the sensing unit for actuating the warning element to provide the warning without deteriorating a performance of the ignition unit.

13 Claims, 5 Drawing Sheets

WARNING SYSTEM FOR AN ENGINE

BACKGROUND OF THE INVENTION

The present invention relates to a warning system for warning a lack of a working fluid of an engine.

One typical example of the conventional warning system for an industrial engine is disclosed in Japanese Patent (unexamined) publication 62(1987)-26379, for example. In this earlier attempt, the engine is stopped by a fluid level warning circuit electrically connected to an ignition device when a lack of the working fluid, for example, a lower limit of an oil level is detected.

Japanese patent (unexamined) Publication 62(1987)121833 teaches an attempt to provide a warning when an abnormality of an engine is detected. In the prior art, a warning device is connected in series with an engine abnormality detecting circuit and is supplied with an electric power by an ignition circuit. When an abnormality of the engine is detected, an electrical load for warning, such as a light emitting diode (hereinafter referred to as LED), is driven and the engine is stopped.

In small engines such as industrial engines (for utility), voltage is applied from a magneto to an ignition circuit. In this case, current which flows in the ignition circuit decreases when the LED is lit. This is because relatively large current is needed for lighting the LED. Thus, ignition energy for the ignition circuit decreases, so that hunting of the engine may take place.

For this reason, it is necessary to stop the engine simultaneously with the lighting of the LED when a lack of an engine oil is detected. However, when there is enough time until an engine trouble occurs after the engine oil decreases to a predetermined oil level, it is preferable not to stop the engine at once for continuing a work using the engine.

To overcome this problem, a separate power source such as a lighting coil may be provided other than the magneto, and the LED may be lit by the separate power source. However, the separate power source rather increases cost of the warning circuit.

SUMMARY OF THE INVENTION

Accordingly, it is an object of the present invention to provide a warning system for an engine, which system indicates a lack of a working fluid in the engine without stopping the engine when the working fluid decreases below a lower limit level during an operation of the engine.

It is another object of the present invention to provide a warning system for an engine, which system does not need any separate power source other than a magneto for driving an electric load for warning.

In view of these and other objects, the present invention provides a warning system for warning a lack of a working fluid for an engine of the type including an ignition means supplied with an ignition power supply from a magneto, comprising: sensing means for sensing the lack of the working fluid and producing a detection signal; warning means connected to the magneto for receiving a power supply to give a warning indicating the lack of the working fluid; and a controller responsive to the detection signal from the sensing means for actuating the warning means to provide the warning without deteriorating a performance of the ignition means.

DETAILED DESCRIPTION OF THE PREFERRED EMBODIMENTS

Figure 1:
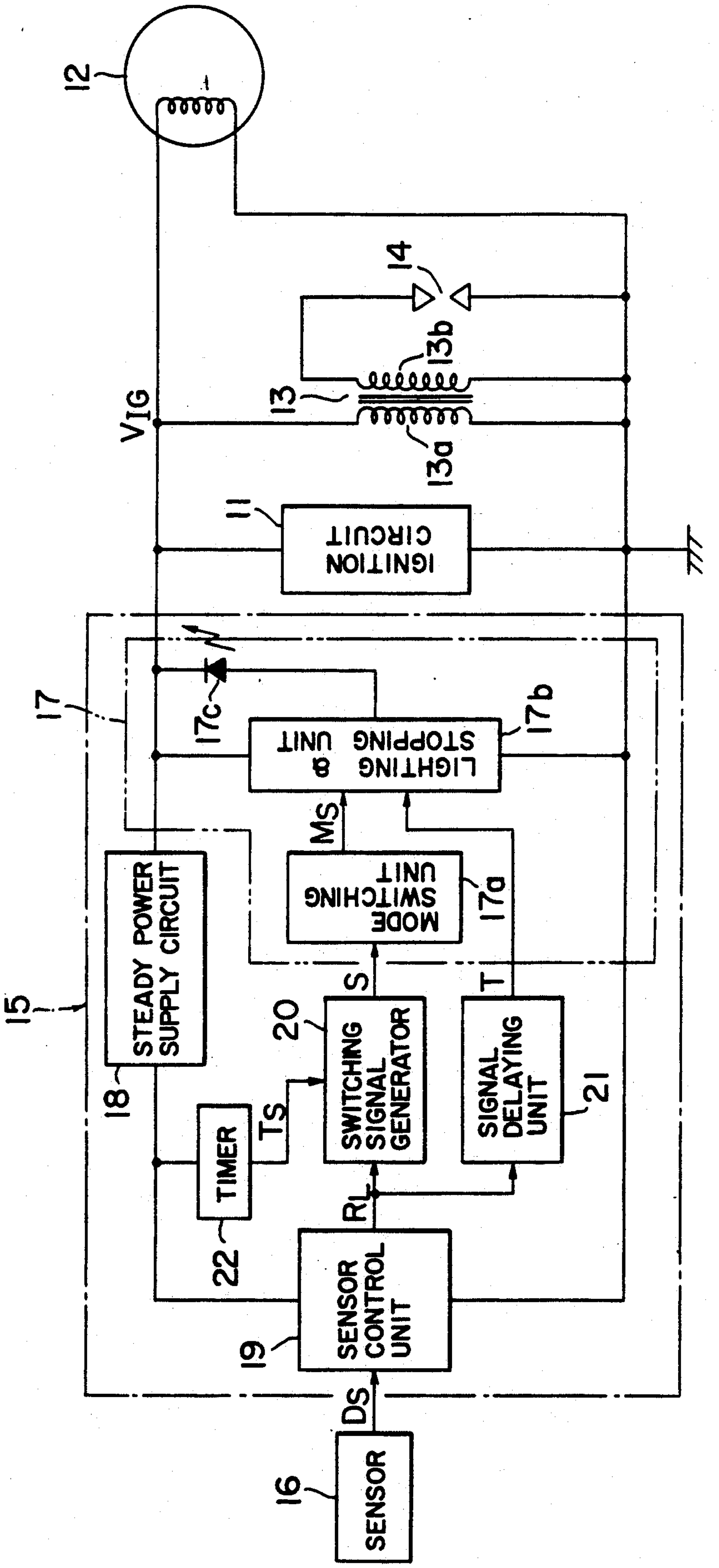
FIG. 1 is a block diagram of a warning and stopping system of an engine according to the present invention.

Referring to the drawings, preferred embodiments of the present invention will be described. In the drawings, like reference numerals indicate corresponding parts throughout views and descriptions thereof are omitted after once given.

A warning and stopping circuit of an industrial engine according to the present invention is illustrated in FIG. 1, in which reference numeral 11 designates an ignition circuit. An ignition voltage VIG is supplied from a magneto 12 to the ignition circuit 11. The ignition circuit 11 is connected in parallel with a primary coil 13*a* of an ignition coil 13. A secondary coil 13*b* of the ignition coil 13 is connected to an ignition plug 14.

A warning and stopping circuit 15 is connected to the primary coil 13*a* of the ignition coil 13 in parallel with the ignition circuit 11. The warning and stopping circuit 15 is connected to a sensor 16 for sensing a lack of a working fluid such as an engine oil.

The warning and stopping circuit 15 includes a warning lamp lighting and engine stopping controller 17 which is connected to the magneto 12. The warning and stopping circuit 15 is further provided with a steady power supply circuit 18, a sensor control unit 19, a switching signal generator 20, a signal delaying unit 21 and a timer 22.

The controller 17 includes a mode switching unit 17*a* and a lighting and stopping unit 17*b* connected to the mode switching unit 17*a*. The lighting and stopping unit 17*b* is connected in parallel with the ignition circuit 11, and an LED 17*c* as a warning lamp is connected to the lighting and stopping unit 17*b*.

The steady power supply circuit 18 rectifies and smoothes the ignition voltage VIG and supplies a rectified and smoothed voltage to each part of the warning and stopping circuit 15. When the voltage of the steady power supply circuit 18 reaches a predetermined level and becomes stable after the engine starts, the timer 22 starts time delay operation. After the time delay operation is completed, a high level output signal TS is outputted from the timer 22 to the switching signal generator 20.

The sensor control unit 19 outputs a high level detection signal RL, for example, according to a detection signal DS from the sensor 16 when the oil level becomes below a lower limit level.

The detection signal RL is inputted to the switching signal generator 20 and the signal delaying unit 21. In response to the detection signal RL the switching signal generator 20 outputs a switching signal S to the mode switching unit 17a of the controller 17.

The detection signal RL is delayed by the signal delaying unit 21 and outputted as an actuating signal T to the lighting and stopping unit 17b.

The lighting and stopping unit 17b includes two operating modes: that is, a warning mode by lighting the LED 17c and an engine stopping mode by short-circuiting the ignition voltage VIG of the magneto 12. When the detection signal RL is inputted to the switching signal generator 20 before a high level output signal TS is received from the timer 22, the switching signal generator 20 produces a switching signal S, and in response to the switching signal S the mode switching unit 17a produces a mode switching signal MS to place the lighting and stopping unit 17b in the engine stopping mode.

In the case where the detection signal RL is inputted to the switching signal generator 20 when or after the high level output signal TS is Provided from the timer 22 to the switching signal generator 20, the LED lighting mode of the lighting and stopping unit 17b is established by the mode switching unit 17a.

Figure 2:
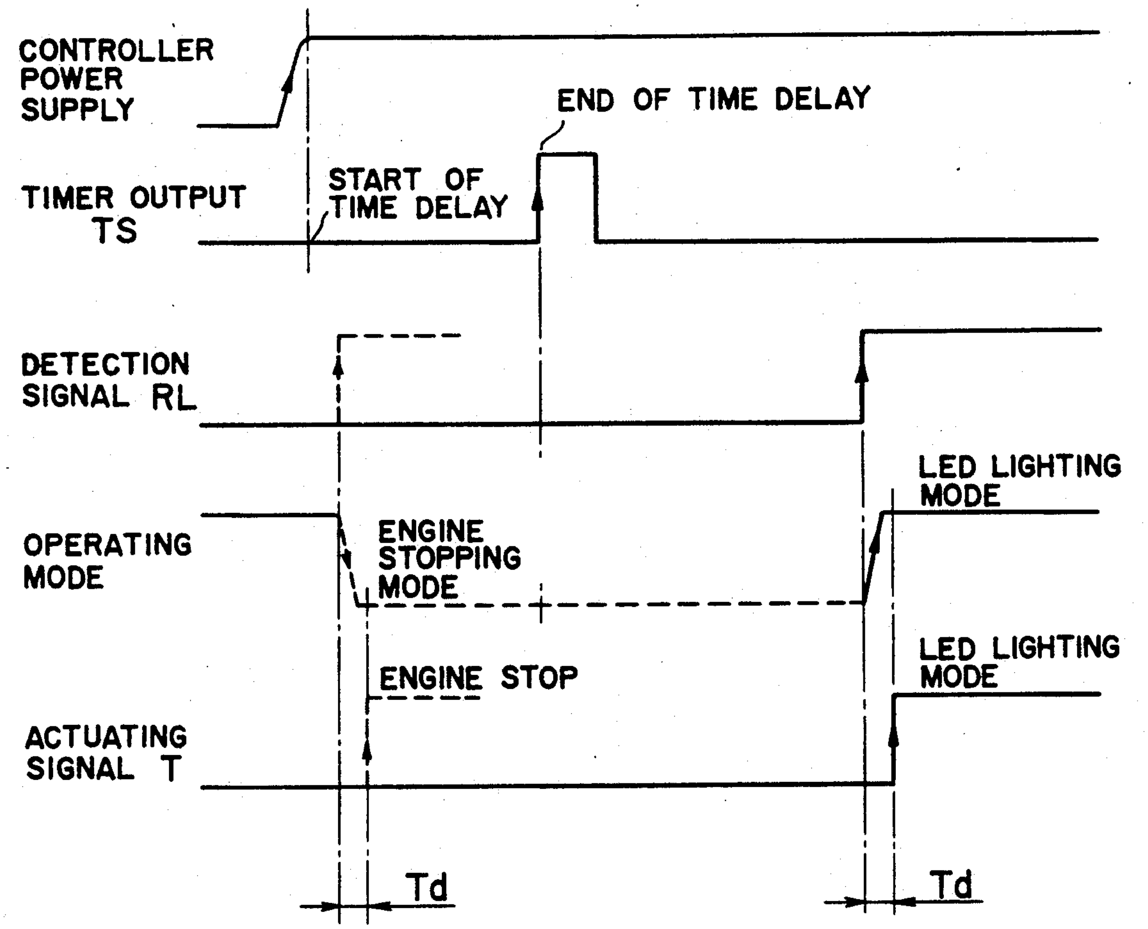
FIG. 2 is a timing chart illustrating a warning lamp lighting mode and an engine stopping mode of the warning and stopping system of FIG. 1.

The operation of the warning and stopping circuit 15 will be described with reference to the time chart of FIG. 2.

When the engine starts, the ignition voltage VIG is supplied from the magneto 12, and then when an engine speed reaches a predetermined speed, voltage rectified and smoothed by the steady power supply circuit 18 reaches a predetermined level and is stabilized over the predetermined level. Consequently, the timer 22 starts the time delay operation in which the timer 22 starts to count the time and produces the high level output signal TS after the predetermined time is lapsed.

When the sensor 16 detects a lack of an engine oil, for example, the detection signal DS is provided to the sensor control unit 19. Consequently, the sensor control unit 19 outputs a high level detection signal RL to both the switching signal generator 20 and the signal delaying unit 21 as illustrated by the broken line in FIG. 2. When the high level detection signal RL is provided to the switching signal generator 20 before the timer 22 outputs the high level output signal TS to the switching signal generator 20, the switching signal generator 20 outputs a switching signal S to the mode switching unit 17a so that the mode switching unit 17a outputs the mode switching signal MS to the lighting and stopping unit 17b to establish an engine stopping mode of the lighting and stopping unit 17b as also shown by the broken line in FIG. 2. In this event, the actuating signal T which is provided from the signal delaying unit 21 to the lighting and stopping unit 17b is delayed by a delay time Td sufficient to establish the engine stopping mode as also shown by the broken line.

By these operations, the ignition voltage VIG is shorted by the lighting and stopping unit 17b, so that the primary coil 13a of the ignition coil 13 drops below an ignition limit voltage. Thus, the engine is positively stopped without any malfunction.

On the other hand, when the engine oil reduces below a predetermined lower limit oil level after the switching signal generator 20 receives the high level output signal TS from the timer 22, the sensor control unit 19 outputs a high level detection signal RL to the switching signal generator 20. According to the detection signal RL, the switching signal generator 20 provides a switching signal S to the mode switching unit 17a, which accordingly outputs a mode switching signal MS to the lighting and stopping unit 17b to switch the lighting and stopping unit 17b to the LED lighting mode. In this event, the detection signal RL from the sensor control unit 19 is inputted to the lighting and stopping unit 17b through the signal delaying unit 21 with the delay time Td. Thus, the LED 17c positively lights without any malfunction.

Figure 3:
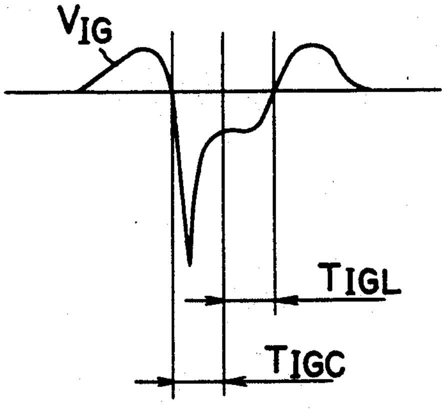
FIG. 3 is a graph showing a wave form of the ignition power source in FIG. 1.

The lighting and stopping unit 17b shifts the timing to short-circuit the ignition voltage VIG from an arc discharge region TIGC in an ignition region of the ignition voltage VIC to a glow discharge region TIGL following the arc discharge region as shown in FIG. 3. The arc discharge region TIGC and the glow discharge region TIGL are due to capacitive and inductive components, respectively. Thus, the ignition energy loss due to the lighting of the LED 17c is fairly small, and hence the lighting of the LED 17c does not deteriorate ignition performance of the ignition plug 14. Therefore, the LED 17c lights without stopping the engine when the engine oil decreases below the lower limit level after the timer 22 outputs the high level output signal TS.

When the predetermined lower limit oil level is set with a sufficient margin of safety, the warning and stopping circuit 15 enables the work using the engine to continue for a while. The warning and stopping circuit 15 provides less expensive construction than the conventional warning equipment.

The warning and stopping circuit 15 stops the engine when it is detected within a predetermined time interval after the engine starts that the amount of the working fluid is below a safety margin. Thus, the engine is stopped at once in the case where the engine is restarted without supplying the working fluid in spite of the warning being given. This prevents engine troubles from taking place.

The working fluid may be a cooling water. The warning may be given by an electrical load, such as an hour meter, in place of the LED 17c.

Figure 4:
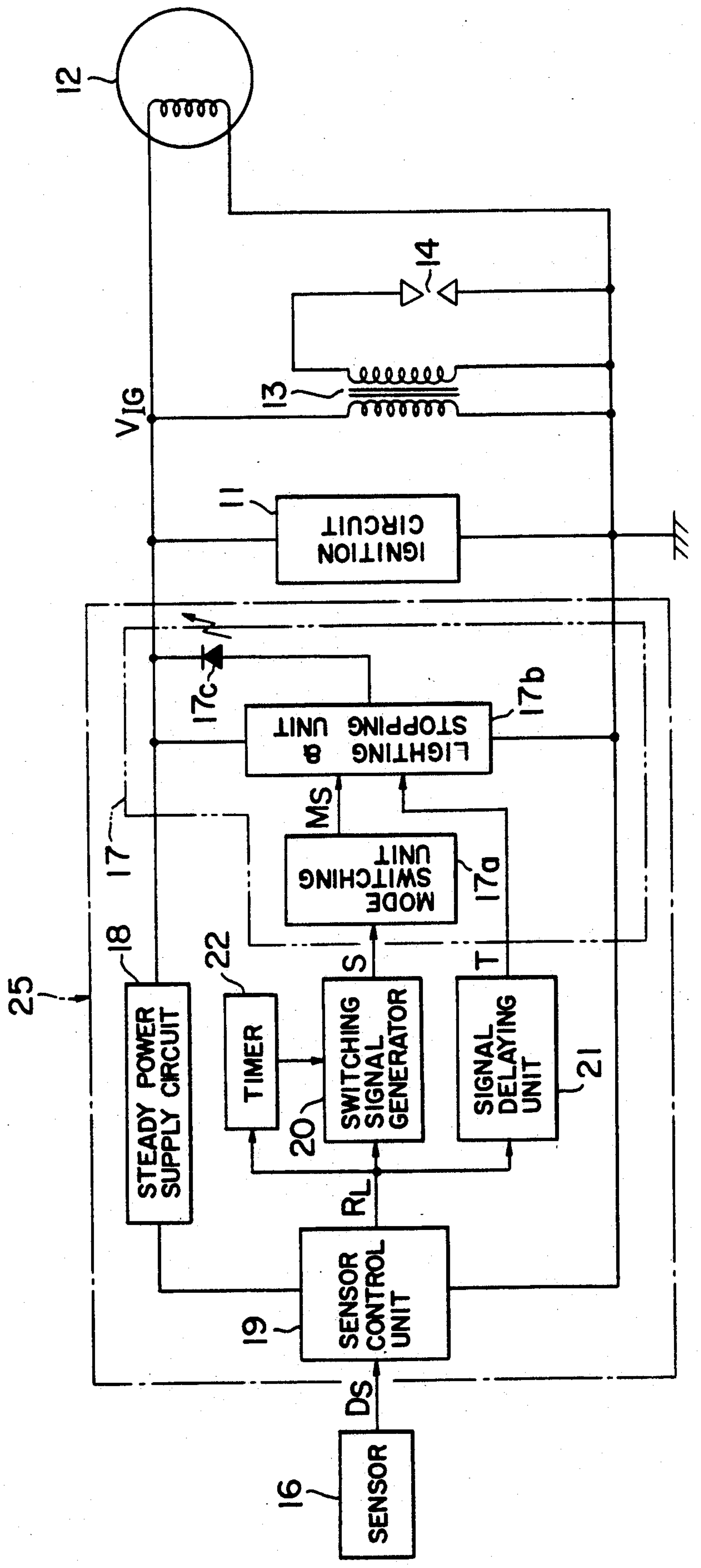
FIG. 4 is a block diagram of a modified form of the warning and stopping system of FIG. 1.
Figure 5:
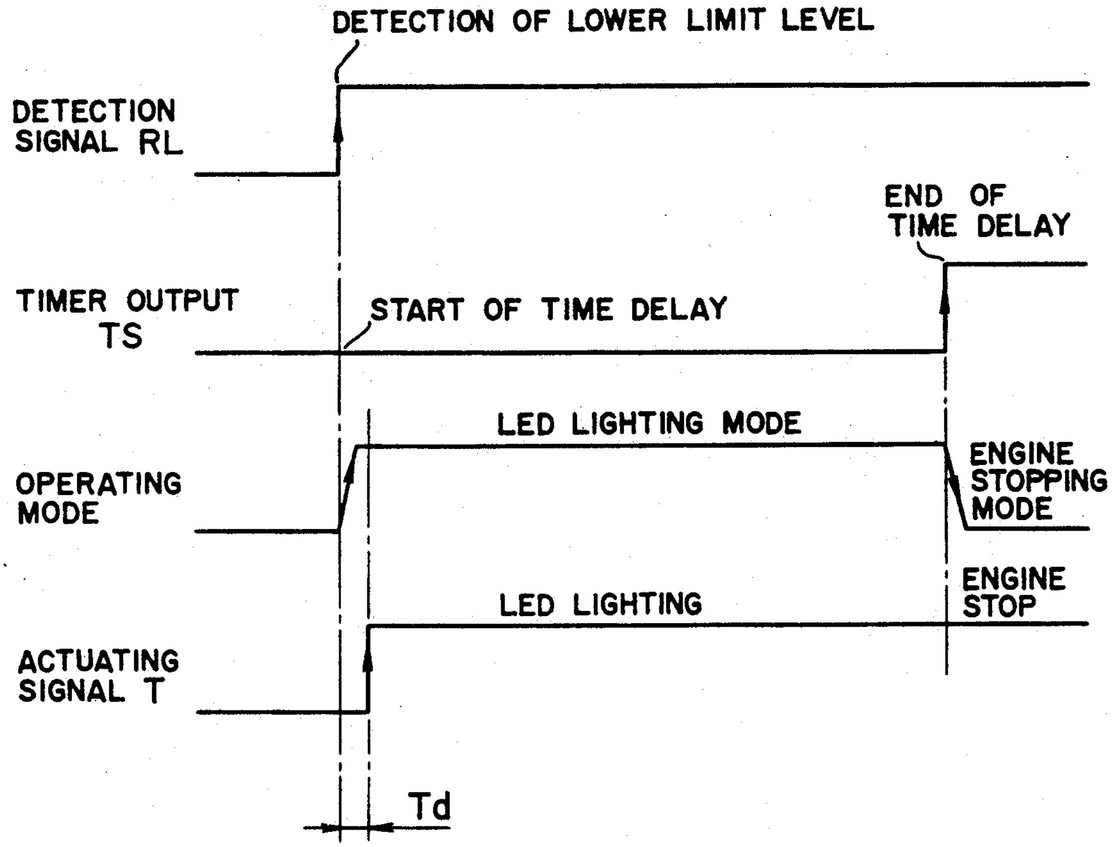
FIG. 5 is a timing chart showing a warning lamp lighting mode and an engine stopping mode of the warning and stopping system of FIG. 4.

A modified form of the warning and stopping circuit 15 of FIG. 3 is illustrated in FIG. 4. In this modified warning and stopping circuit 25, a detection signal RL is inputted from the sensor control unit 19 to the timer 22 as well as the switching signal generator 20 and the signal delaying unit 21.

In response to the detection signal RL, the switching signal generator 20 outputs a high level switching signal S to the mode switching unit 17a before the switching signal generator 20 receives a high level output signal TS from the timer 22. As a result, the mode switching unit 17a outputs a mode switching signal MS to switch the lighting and stopping unit 17b to the LED lighting mode. In this mode, the lighting and stopping unit 17b receives an actuating signal T from the signal delaying unit 21 with a delay time Td and then lights the LED 17c. Also in this modified warning and stopping circuit 15, the lighting and stopping unit 17b shifts the timing to short the ignition voltage VIG from an ar discharge region TIGC in an ignition region of the ignition plug 14 to a glow discharge region TIGL to light the LED 17c as shown in FIG. 3.

The timer 22 outputs the high level output signal TS to the switching signal generator 20 in a predetermined interval after receiving the detection signal RL. According to the output signal TS, the switching signal generator 20 inverts the switching signal S to a low level. With the inverted switching signal S, the mode switching unit 17a switches the lighting and stopping unit 17b from the LED lighting mode to the engine stopping mode. Thus, the ignition voltage VIG is short-circuited to drop the primary coil 13*a* below an ignition voltage level, so that the engine is stopped.

In this modified warning and stopping circuit 25, the engine is always stopped in a predetermined time after a lack of a working fluid is detected. Thus, the warning and stopping circuit 25 positively prevents any abnormality of the engine from taking place.

Figure 6:
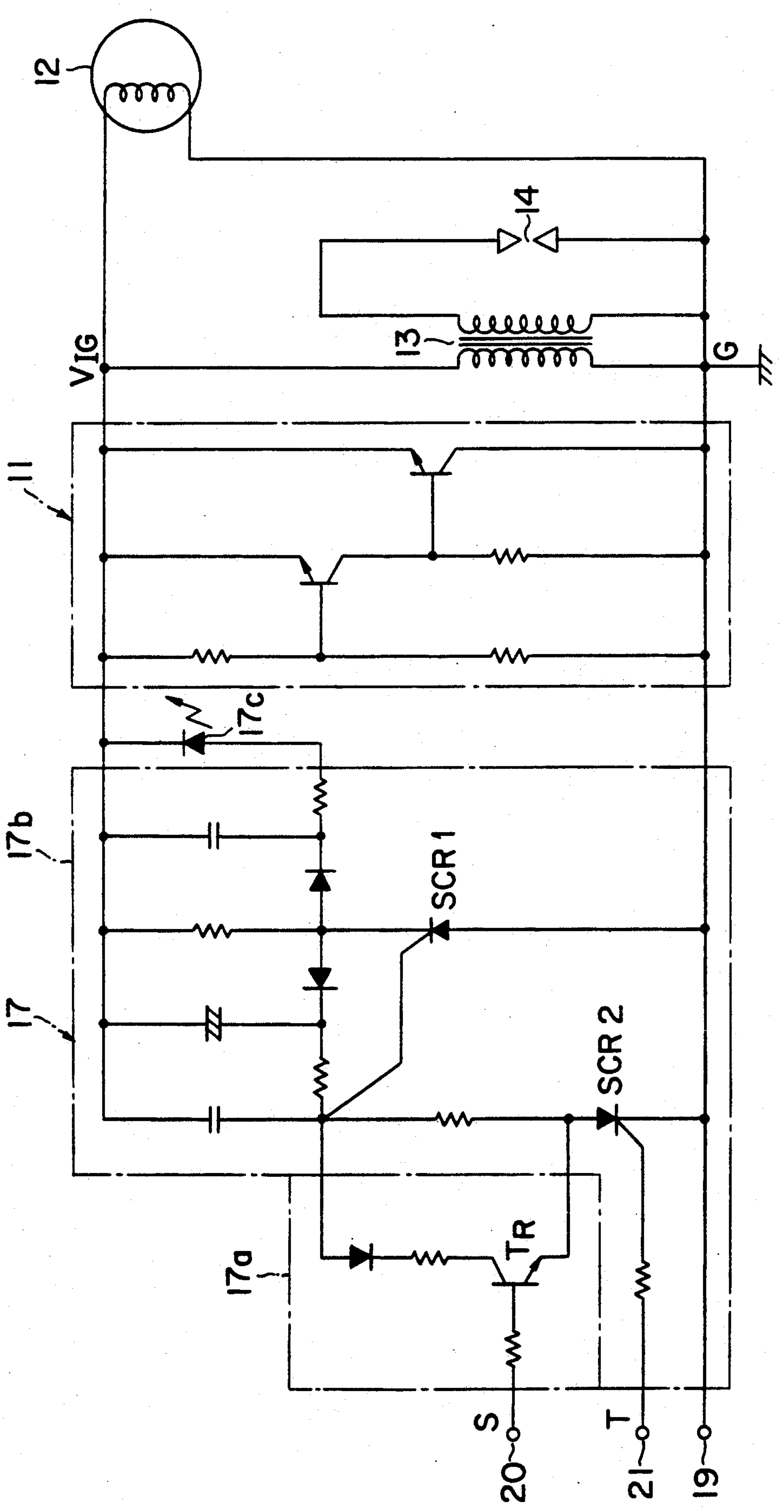
FIG. 6 is a detailed circuitry of a part of the warning and stopping system of FIGS. 1 and 4

FIG. 6 shows one example of a detailed circuitry of the ignition circuit 11 and the mode switching unit 17*a* and the lighting and stopping unit 17*b* of the controller 17 in FIGS. 1 and 4. When a low level signal for the stopping mode is applied to a base of a transistor TR in the mode switching unit 17*a* and a high level signal from the sensor control unit 19 is applied to a gate of a thyristor SCR2 in the lighting and stopping unit 17*b*, a high level signal is applied to a gate of a thyristor SCR1 in the lighting and stopping unit 17*b* at a timing of the arc discharge region so as to enable the engine to stop as mentioned above. On the other hand, when a high level signal for the lighting mode is supplied to the base of the transistor TR while the thyristor SCR2 is turned on, application of the high level signal to the gate of the thyristor SCR2 delays so that the ignition voltage is shorted at a timing of the glow discharge region.

LED 17*c* is lighted to indicate a lack of the working fluid.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A warning system for warning a lack of a working fluid for an engine, said engine having a magneto provided to generate a power supply, an ignition plug, ignition means responsive to said power supply for activating said ignition plug to spark, and warning means connected to said magneto for indicating said lack of the working fluid, comprising:

sensing means for sensing said lack of the working fluid and for producing a lack detection signal when said lack is detected;

timer means for counting a predetermined time period and for producing a timer signal after said predetermined time period;

switching means responsive to said lack detection signal for producing one of an engine stopping mode signal and a warning mode signal before receiving said timer signal and for producing the other of said engine stopping mode signal and said warning mode signal after receiving said timer signal; and control means responsive to said engine stopping mode signal for short-circuiting said ignition circuit to stop the operation of said engine and responsive to said warning mode signal for activating said warning means.

2. The system according to claim 1, wherein said magneto is adapted to supply said ignition power supply including an arc discharge region and a glow discharge region and said control means is adapted to activate said warning means in said glow discharge region so that the warning is provided without deteriorating the performance of said ignition means.

3. The system according to claim 1, wherein said timer means is adapted to count said predetermined time from the point of engine start, and said switching means is adapted to produce said engine stopping mode signal for immediately stopping said engine after said engine start when said lack detection signal is received before receiving said timer signal and to produce said warning mode signal for warning said lack of working fluid without stopping said engine when said lack detection signal is received after receiving said timer signal, so as to enable continued operation of said engine.

4. The system according to claim 1, wherein said timer means is adapted to respond to said lack detection signal for starting to count said predetermined time period, and said switching means is adapted to produce said warning mode signal when said lack detection signal is received before receiving said timer signal and to produce said engine stopping mode signal in response to said timer signal, thereby stopping said engine after said predetermined time period when said lack of working fluid is detected.

5. The system according to claim 1 further comprising:

delaying means for producing an actuating signal to said control means at a predetermined delay time after receiving said lack detection signal, whereby said control means starts to short-circuit said ignition circuit in response to said actuating signal.

6. The system according to claim 1 wherein said sensing means comprises:

a sensor for sensing an amount of said working fluid remaining in said engine and for generating a detection signal; and a sensor control unit responsive to said detection signal for producing a lack detection signal when said amount of the working fluid falls below a predetermined value.

7. A warning system for indicating a lack of a working fluid for an engine, having a magneto provided to generate a power supply, an ignition plug provided in a cylinder for igniting air and fuel mixture, and ignition means responsive to said power supply for activating said ignition plug to spark, comprising:

sensing means for producing a lack detection signal indicating the lack of the working fluid when an amount of the working fluid falls below a predetermined value;

timer means for counting a predetermined time period after engine start and for generating a timer signal after said predetermined time period;

switching means responsive to said lack detection signal and said timer signal for deciding an engine stopping mode when said lack is detected before said predetermined time period is lapsed and for deciding a warning mode when said lack is detected after said predetermined time period is lapsed, and for outputting a switching signal indicating one of said engine stopping mode and warning mode; and control means responsive to said switching signal for stopping said engine when said switching signal indicates said engine stopping mode or for warning said lack of working fluid when said warning mode is indicated by said switching signal.

8. The system according to claim 7 further comprising:

delaying means responsive to said lack detection signal for generating an actuating signal with a predetermined delay time after receiving said lack detection signal so as to delay the operation by said control means.

9. A warning system for indicating a lack of a working fluid for an engine, having a magneto provided to generate a power supply, an ignition plug provided in a cylinder for igniting air and fuel mixture, and ignition means responsive to said power supply for activating said ignition plug to spark, comprising:

sensing means for producing a lack detection signal indicating the lack of the working fluid when an amount of the working fluid falls below a predetermined value;

timer means responsive to said lack detection signal for counting a predetermined time period after said lack is detected and for generating a timer signal after said predetermined time period is lapsed;

switching means responsive to said lack detection signal and said timer signal for producing a switching signal indicating a warning mode before said predetermined time period is lapsed and for producing a switching signal indicating a engine stopping mode after said predetermined time period is lapsed; and control means responsive to said switching signal indicating one of said mode for warning said lack of working fluid when said switching signal indicates said warning mode and for stopping said engine when said engine stopping mode is indicated by said switching signal.

10. The system according to claim 9 further comprising:

delaying means responsive to said lack detection signal for generating to said control means an actuating signal with a predetermined delay time after receiving said lack detection signal so as to delay the operation of said control means.

11. A warning system for warning a lack of a working fluid for an engine having an ignition plug, a magneto for generating an ignition power supply including an arc discharging region and a glow discharging region, ignition means responsive to said ignition power supply of said arc discharging region for activating said ignition plug to spark, sensing means for sensing the lack of the working fluid and producing a detection signal and warning means connected to the magneto for warning the lack of the working fluid, comprising:

a controller responsive to said detection signal for actuating said warning means using said ignition power supply of said glow discharging region to provide the warning without deteriorating a performance of said ignition means.

12. The system according to claim 11, further comprising:

a timer adapted to be activated when said engine starts and to produce an output signal in a predetermined time, and wherein:

said controller is adapted to short circuit said magneto for deactivating said ignition means to stop said engine when said controller receives said detection signal from said sensing means before receiving said output signal, and said controller is adapted to actuate said warning means to give the warning when said controller receives goth said detection signal and said output signal.

13. The system according to claim 11, further comprising:

a timer adapted to be activated when said timer receives said detection signal from said sensing means and to provide an output signal in a predetermined time, and wherein:

said controller is adapted to short circuit said magneto for deactivating said ignition means to stop said engine when said controller receives both said detection signal and said output signal; and said controller is adapted to actuate said warning means to give the warning when said controller receives said detection signal before receiving said output signal.

* * * * *